(12) United States Patent
Safadi

(10) Patent No.: US 6,487,721 B1
(45) Date of Patent: Nov. 26, 2002

(54) APPARATUS AND METHOD FOR DIGITAL ADVERTISEMENT INSERTION IN A BITSTREAM

(75) Inventor: Reem Safadi, Horsham, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/227,793

(22) Filed: Jan. 8, 1999

Related U.S. Application Data
(60) Provisional application No. 60/073,106, filed on Jan. 30, 1998.

(51) Int. Cl.[7] .............................. H04N 7/10; H04N 7/025

(52) U.S. Cl. ........................................... 725/36; 725/32

(58) Field of Search .............................. 725/35, 36, 32, 725/42; 348/473, 705, 722; 375/240.26; H04N 7/10, 7/025

(56) References Cited

U.S. PATENT DOCUMENTS

| | | | |
|---|---|---|---|
| 4,724,491 A | | 2/1988 | Lambert |
| 5,029,014 A | | 7/1991 | Lindstrom |
| 5,099,319 A | * | 3/1992 | Esch et al. ..................... 725/36 |
| 5,424,770 A | | 6/1995 | Schmelzer et al. |
| 5,446,919 A | * | 8/1995 | Wilkins ........................ 725/35 |
| 5,534,944 A | | 7/1996 | Egawa et al. |
| 5,600,366 A | * | 2/1997 | Schulman ..................... 725/36 |
| 6,137,834 A | * | 10/2000 | Wine et al. .................. 375/240 |
| 6,154,496 A | * | 11/2000 | Radha .................... 375/240.28 |

FOREIGN PATENT DOCUMENTS

WO  WO 97/45965  12/1997

OTHER PUBLICATIONS

"Proposed SMPTE for Television—Splice Points for MPEG–2 Transport Streams," SMPTE–312M. SMPTE Journal, Oct., 1998, pp. 916–925.*

"Revised Text for ITU–T Recommendation H.222.0 || ISO/IEC 13818–1, Information technology—Generic coding of moving pictures and associated audio information: Systems," ISO/IEC JTC 1/SC 29, Apr. 27, 1995, pp. 135–138 (Annex L—Splicing Transport Streams).

"Proposed SMPTE Standard for Television—Splice Points for MPEG–2 Transport Streams," SMPTE–312M. SMPTE Journal, Oct. 1998, pp. 916–925.

Perkins et al., "A Proposed Standard for Splicing, v.1.0," DiviCom, Aug. 1, 1996, pp. 1–15.

* cited by examiner

*Primary Examiner*—Andrew Faile
*Assistant Examiner*—Andrew Y. Koenig
(74) *Attorney, Agent, or Firm*—Barry R. Lipsitz; Douglas M. McAlliste

(57) ABSTRACT

A system for inserting commercials into an audiovisual bit stream by providing cue commands in response to cue tones in a pre-existing analog signal, and/or in response to control signals from an uplink (/programmer/network) site or headend (/affiliate). Firmware upgrades are provided to a digital encoder to facilitate generating spliceable bit streams and generation of cue_commands. This enables commercial insertion at an uplink site (/programmer/network) as well as at a cable television headend (/affiliate). The system provides functional compatibility between a digital bit stream and the analog cue tones. The cue commands are preferably carried in the transport layer of the bit stream so there is no need to decode and process several layers of the bit stream. Accordingly, a new commercial insertion capability can be added to existing uplink and headend equipment in a backward compatible manner minimizing upgrade-related expenses, yet allowing different splicing techniques to be employed depending on cost-performance tradeoffs in terms of desired post-splicing audiovisual quality.

18 Claims, 4 Drawing Sheets

APPARATUS AND METHOD FOR DIGITAL ADVERTISEMENT INSERTION IN A BITSTREAM

This application claims the benefit of U.S. provisional patent application Ser. No. 60/073,106, filed Jan. 30, 1998.

BACKGROUND OF THE INVENTION

The present invention provides a system approach to digital advertisement insertion in a television signal or the like that is consistent for both satellite television uplinks and cable television headends. The invention is particularly adapted for use with analog television signals that are subsequently digitized, e.g., using an MPEG-2 compression system.

Analog television signals are commonly broadcast over satellite links to headends of cable television networks or affiliate sites of Broadcaster's network. The term "headend" is used hereafter even though the same applies to an affiliate site. Programming signals from different cable or television networks (e.g., CNN, ABC) are provided with cue tones, which signal the start and end of a message break period during which commercials may be run. Each network generally has a unique cue tone which occurs a few seconds before the start and end times of the insertion window.

For example, the network signal may leave blank air time during this period to allow the headend to insert commercials of local interest when the cue tones are detected. Typically however, the network's national commercial may get replaced by a local commercial if the window or part of it allows such replacement and a replacement is available locally. The commercials may be paid advertisements, unpaid public service announcements, or the like. The content may be video, audio, and/or other data (e.g., HTML pages with hyperlinks, etc.). Note that in the data-only case, the original programming (with or without a national ad) may be left intact with locally originated data added as supplementary information to the original content. For example, web-supported ads, with locally generated web pages, can be facilitated. The bandwidth requirements for insertion of such data are minimal. Regardless, the required bandwidth would have been allocated a priori.

The cable headend operator may use automated equipment that controls video tape players and positions the local commercial or other messages for playback and insertion when cued at the proper time.

Or, the network signal may include its own commercials which can optionally be electronically pre-emptied by the local insertions.

Typically, the message break (window) is one or two minutes in duration, which allows a number of commercials. Commercial or "spot" durations vary. Some are fifteen seconds or less, while others are thirty seconds, sixty seconds, etc.

Currently, however, broadcasting of digital audiovisual content has become increasingly popular in cable networks and soon in TV broadcast networks, and is expected to gradually supplant the analog schemes. Various standards have been developed for the communication of digital audiovisual content such as the MPEG-2 standard. Moreover, MPEG-2 provides a framework, albeit incomplete, for splicing of transport streams, discussed in "Revised Text for ITU-T Recommendation H.222.051 ISO/IEC 13818-1, Information technology—Generic coding of moving pictures and associated audio information: Systems," ISO/IEC JTC 1/SC 29, Apr. 27, 1995, pp. 135–138 (Annex L—Splicing Transport Streams).

The MPEG-2 standard provides syntax elements that are relevant to splicing in a transport packet adaptation field. The syntax elements include a splicing_point_flag, which is a single bit that indicates whether a splice_countdown field is present. The splice_countdown field is used to count down how many packets of the same packet identifier (PID) occur before the splice point. Additionally, the transport stream packet in which the splice_countdown field value reaches zero is called the splicing packet. The splicing point is located immediately after the last byte of the splicing packet.

However, some of the past proposals to complement the MPEG-2 capability required decoding of several of the data layers in the digital transport stream to obtain information regarding timing (e.g., time stamp values) and buffer fullness status to allow a successful commercial insertion. In another approach, the entire data stream, including video and audio, is decoded in a manner that maintains some of the original encoding parameters. Then, a commercial is inserted into the decoded stream, and the stream is re-encoded using the conveyed parameters which were obtained during decoding. The intent was to enable more efficient re-encoding when compared to re-encoding without these parameters.

Moreover, such digital splicing schemes do not take into account the operational requirements associated with cue tones in the analog domain, nor the various operations that may be applied to the stream prior to commercial insertion, e.g., add/drop multiplexing.

Additionally, there already exists an installed base of equipment, including encoders and transcoders, for digital television distribution, that in many cases does not support the MPEG-2 and other complementary splicing syntax. It would not be economical to redesign and replace such existing equipment to support the MPEG-2 splicing format.

Accordingly, it would be desirable to provide a system for inserting commercials in a digital television transport stream that is compatible with the operational aspects of pre-existing cue tones in analog television signals.

The system should avoid the need to decode and re-encode several data layers in a digital transport stream to obtain information regarding timing and buffer fullness status to allow a successful commercial insertion, thereby simplify and reducing the costs of required insertion equipment.

The system should be backward-compatible with equipment such as encoders, transcoders, and the like, that are already deployed by various cable television and satellite television service providers. Moreover, the system should be able to be implemented with only minor firmware upgrades to existing equipment, which is particularly advantageous when compared to integrated commercial insertion solutions.

The system should allow the use of splicers of varying seamless splicing capability, and should have a relatively minimal impact on the other devices at the uplink or headend (e.g., encoder, transcoder).

The system should further allow add/drop multiplexing prior to, or as part of, commercial insertion.

The system should provide compatibility between satellite television uplinks and cable television headends.

The system should ensure that decoders in consumers' homes are splice-unaware (i.e., unaware of the presence of spliced data). This is to avoid having to replace these decoders and to prevent the enabling of "commercial killer" devices which detect and block out commercials.

The system is preferably compatible with constant bit rate (CBR) and variable bit rate (e.g., including statistically multiplexed) streams. In other words, the inserter, depending on its type may operate on CBR streams for insertion, or add/drop (insert) into statistically multiplexed streams. The system described herein applies to both cases.

The present invention provides a system having the above and other advantages.

SUMMARY OF THE INVENTION

The invention relates to a system for inserting commercials into a digital television signal using cue commands. A cue command is functionally analogous to a cue tone but instead of a dual-tone multifrequency (DTMF) implementation of the cue_tone, it is implemented as a protocol message that is understood by the inserters (splicers).

A method for inserting digital commercials into a digital audiovisual bitstream includes the steps of: processing a first audiovisual signal to determine whether cue tones are present therein, encoding the first audiovisual signal as a digital spliceable data stream, and providing cue commands corresponding to the cue tones, if present, in the digital spliceable data stream. The cue commands indicate splicing points for splicing a digital commercial into the digital spliceable data stream.

The term "audiovisual" is used to represent a signal including video, audio, and/or other data, including, but not limited, to a television signal.

The digital spliceable data stream is forwarded to a commercial inserter, which detects the cue commands and inserts a commercial into the digital spliceable data stream in response thereto at a splice point designated by a first detected cue command, and monitors the digital spliceable data stream for a subsequent cue command to splice back from the inserted commercial to the original digital spliceable data stream.

A plurality -of single video program transport streams, including the digital spliceable data stream, may be multiplexed into a multi-program transport stream, and the multi-program transport stream forwarded to the commercial inserter.

In this case, the multi-program transport stream is forwarded to a commercial inserter, which detects the cue commands and inserts a commercial into the digital spliceable data stream in response thereto at a splice point designated by a first detected cue command, and monitors the multi-program transport stream for a subsequent cue command to splice back from the inserted commercial to the multi-program transport stream.

The first audiovisual signal may be an analog signal, in which case it is digitized and compressed to provide the digital spliceable data stream.

The cue commands are provided at the uplink site, or a remote studio site, while the commercials may be inserted at the uplink site and/or at a headend. In some cases, the digital audiovisual signal is originated locally from a server located in the headend.

Preferably, the cue commands are provided as a message in the digital spliceable data stream in a transport layer such that they may be readily detected by the inserter without having to decode several layers of the data stream.

Furthermore, the cue commands may designate desired or required program attributes of the inserted commercial, such as bit rate, and stream construct, such as number of audio streams, and the like.

Moreover, even if no cue tones are detected, the cue commands may be provided in response to a local network device, such as a real-time trigger or a scheduler/controller that is co-located or remotely located in a studio site.

An example syntax of such cue commands which may be used with the present invention is discussed in "Proposed SMPTE Standard for Television—Splice Points for MPEG-2 Transport Streams," SMPTE-312M, SMPTE Journal, October 1998., incorporated herein by reference.

The digital spliceable data stream may be a constant bit rate stream or a variable bit rate stream.

A corresponding apparatus is also presented.

DETAILED DESCRIPTION OF THE INVENTION

The invention relates to a system for inserting commercials into a digital television signal using cue tones.

Figure 1:
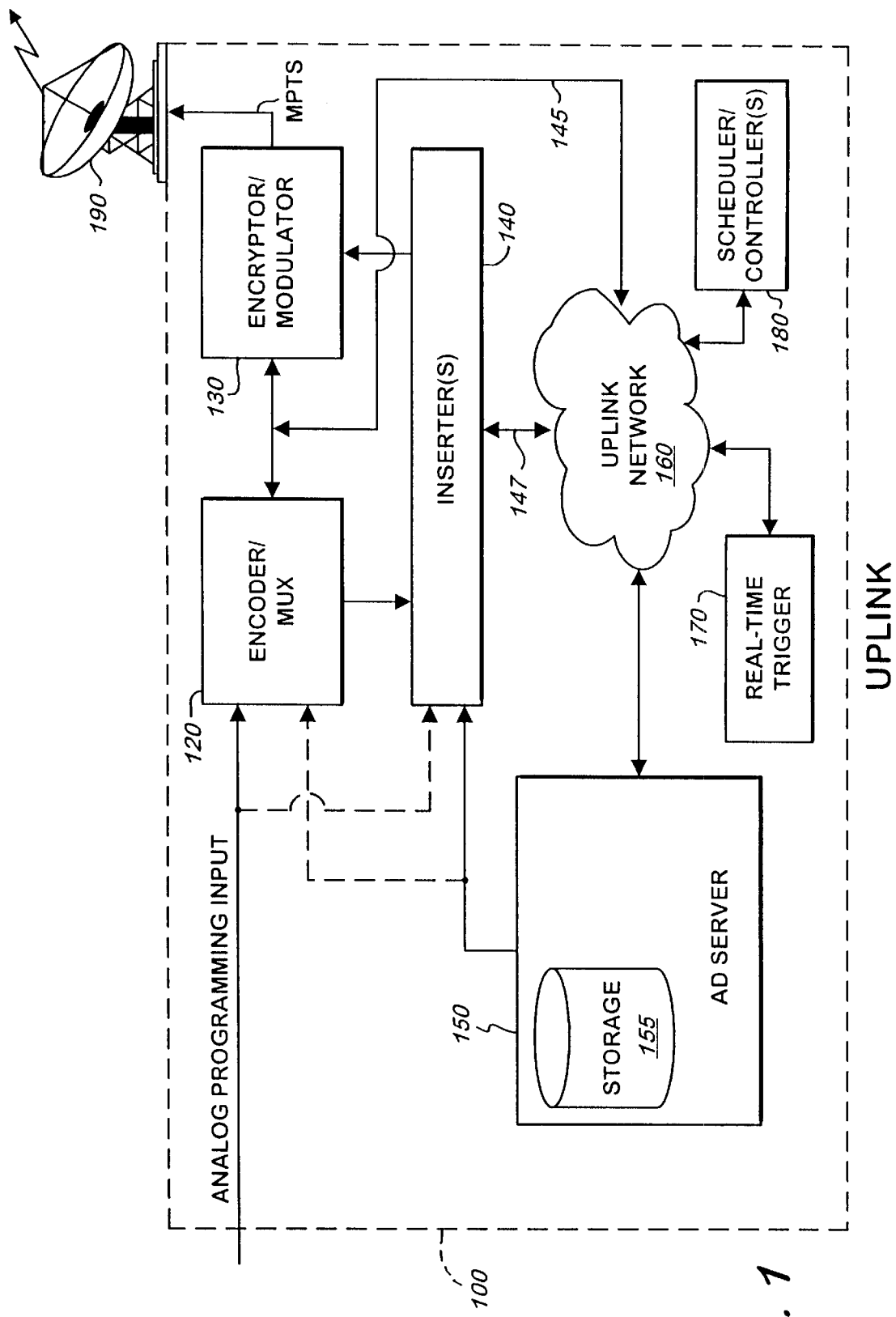
FIG. 1 illustrates a digital television uplink site in accordance with the present invention.

FIG. 1 illustrates a digital television uplink site in accordance with the present invention. The uplink site 100 receives an analog television programming input, e.g., from a programmer studio via a terrestrial or satellite communication link. Or, the programming input may be locally generated. Some or all of the analog television signals have cue tones as they are known in the art for signaling the start and end of a period for inserting one or more commercials.

The term "commercial" or "ad" is used herein to represent any message break, whether paid or unpaid, including paid advertisements (ads), unpaid public service announcements, news and weather messages, and the like, that is provided between regular programming segments.

The term "splice point" is used to designate a point where a commercial insertion is to begin or end.

The analog programming input is provided to an encoder/multiplexer (mux) 120 for digitizing and encoding according to MPEG-2 or a similar digital television standard. Typically, several analog programs are encoded at the encoder/mux 120 to provide corresponding single program transport streams (SPTSs) which are subsequently multiplexed together to form a multi-program transport stream (MPTS). The MPTS is provided to the inserter(s) 140 when it is desired to insert either commercials and/or cue commands in accordance with the present invention.

Note that in other configurations, a single program transport stream may be output from one program stream encoder and then each such output is forwarded to a multiplexer to generate a MPTS. The inserter may insert into a SPTS or a MPTS. The former is a degenerate case of the latter, and as such the MPTS is referenced hereafter. The inserter(s) 140 may be configured in such a manner that the encoder unconditionally outputs the MPTS to the inserter. The inserter, in turn, determines whether to insert a commercial or pass the MPTS through intact (e.g., unchanged). The inserter's decision is based on the presence of the cue command (or lack thereof).

Note that the figures show a functional partitioning that is not necessarily physical. For example, the encoder 120 (as a product) may encompass the following functions: the capability for digitizing, encoding, multiplexing, and encrypting and modulating as one physical box. Alternatively, as mentioned before, the digitizing and encoding functions of a single program stream may be modularized independently from the multiplexing (of the single program streams into multiple program streams), from the encryption function, or from the modulation function.

A number of splicers within an inserter(s) 140 may be provided to allow simultaneous commercial insertion into more than one program.

The inserter(s) 140 receive a digital commercial input from an ad server 150, which includes a storage medium 155 for storing the commercials, such as MPEG-2 ads. The storage medium may comprise any known magnetic or optical storage device, for example. The commercial content may be stored in a pre-compressed format, in which case it can be provided directly to the inserter(s) 140. If the stored commercial content is not pre-compressed, or is even analog, appropriate digitizing and/or compression circuitry should be provided, depending on the cost aspects of the system when compared to analog insertion into an analog audiovisual signal and then encoding the resulting signal (with the commercial).

The commercial content may itself be partially encoded to allow future encoding (total compression) by varying the quantization parameters. This enables rate adaptation such that the commercial content fits the bandwidth allocated for the program to which the commercial belongs. Rate adaptation, as described, may take place in advance of the commercial, and as such may be facilitated as an off-line, non-real time process.

Based on a control signal from an uplink network 160 on a path 147, the inserter(s) 140 may be instructed to insert the commercial content into the MPTS received from the encoder/mux 120. The MPTS with the inserted commercial content is then provided to the encryptor/modulator 130 for conventional encryption processing, which is optional, and modulation. The encrypted MPTS is then provided to a satellite transmitter 190 for transmission to the headend of a cable television network via satellite, for example, as discussed in connection with FIGS. 2 and 4.

Control signals are provided to the encoder/mux 120 and the encryptor/modulator 130 from the p-link network 160 via a path 145.

The uplink network 160 also communicates with the ad server 150, a real-time trigger 170, and schedule controller system 180. One scheduling system and other management controllers 180 may be provided for all inserter(s) 140 and for the encoder/mux 120 and encryption/modulation function 130. The real-time trigger 170 may provide a signal to the inserter(s) 140 and/or encoder/mux 120 requiring the insertion of a commercial and/or a cue command immediately, or at any specified time based on a clock associated with a common "house" clock reference is used which, for example, may be based on a Global Positioning System (GPS) clock or a SMPTE clock, or a real-time (manual) trigger. For example, it may be desired to insert a commercial and/or a cue command at a time that is not specified by a cue tone. Note that a cue command may be inserted into the MPTS without inserting any commercial content at the uplink site 100. There may already be commercial content or a blank period in the MPTS that is subsequently replaced by commercial content at the headend.

The scheduler/controller(s) may communicate with the inserter(s) 140, encoder/mux 120 and/or encryptor/modulator 130 as required to control the respective devices, to maintain a record of inserted commercials and cue commands, and to maintain and follow a schedule for providing future commercials and cue commands. The scheduler/controller(s) 180 may provide a control signal to the inserter(s) 140 to pass the data stream through unchanged.

The scheduler/controller(s) 180 may monitor and detect the status of the inserter(s) 140 to determine whether a commercial has been inserted, or if an error has occurred. It may also configure the inserter(s) 140 for a specific time-out value that should be used whenever a second cue_command is not detected within the prescribed time limit.

At the uplink site 100, a method of applying the invention includes the following steps:

1. The encoder/mux 120 encodes a given analog signal as a spliceable MPEG-2 compressed stream. If the input signal contains any cue tones, the encoder converts them to cue commands that may later be used by the uplink inserter(s) 140 or the headend inserter(s) 220. The encoder input can also be an uncompressed digital bit-stream (e.g., corresponding to the CCIR 601 standard).

2. The encoder multiplexes single program transport streams (SPTS) into a multi-program transport stream (MPTS) and forwards the MPTS to the inserter 140.

3. The inserter 140 detects the insertion command for a splice point and inserts the commercial. Note that the inserter itself may forward the detected cue_command to the ad server 150 for any processing (e.g., re-quantization transcoding) to prepare the commercial for insertion. In this case, the cue command is provided typically in advance of the actual insertion_time. In fact, the cue command may be provided well in advance of the splicing time, e.g., one-half hour, as well as just before (a few second), or simultaneously with, the splicing time. The cue command also includes descriptive parameters pertaining to the program attributes that the commercial must match (e.g., rate, stream construct such as number of audio streams, etc.)

4. The inserter monitors the stream for the second cue command (or until it times out) to splice back to the original multiplex.

5. The output of the inserter is passed to the encryptor/modulator 130.

6. Moreover, note that the cue commands may be inserted into a SPTS in the alternate configuration where SPTS are created and then multiplexed in a separate multiplexing module.

Figure 2:
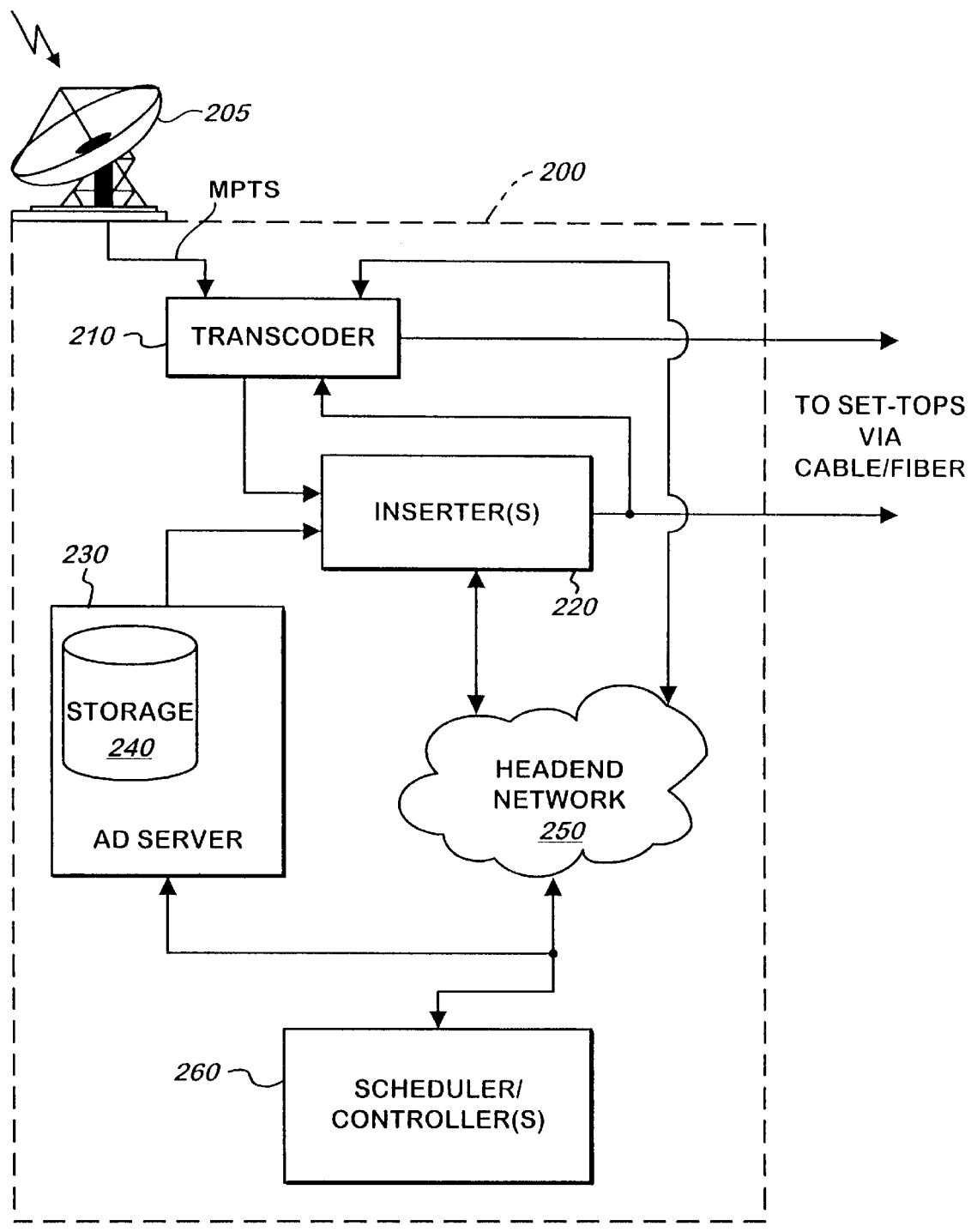
FIG. 2 illustrates a digital television headend in accordance with the present invention.

FIG. 2 illustrates a digital television headend in accordance with the present invention. The headend 200 includes a satellite receiver 205 for receiving the MPTS from the uplink site 100 of FIG.

1. A transcoder 210 is commonly provided to receive the satellite signal, demodulate it, apply error correction, decrypt and re-encrypt for local distribution, and modulate it after applying forward error correction for transport over the cable network.

The transcoder 210 provides a decrypted pre-insertion MPTS to inserter(s) 220, which are analogous to the inserter(s) 140 at the uplink site 100. The inserter(s) 220 insert pre-compressed digital commercial content from an ad server 230 which has a storage medium 240, e.g., for MPEG-2 ads, and provides the resulting MPTS back to the transcoder 210 for optional encryption. The inserter may output an unencrypted post-insertion MPTS. A modulator may be provided at the inserter 220, or a modulator at the transcoder 210 may be used without applying encryption there.

Alternatively, the inserter 220 may forward the detected cue command to the ad server 230 for any processing (e.g., re-quantization transcoding) to prepare the commercial for insertion. In this case, the cue command is provided typically in advance of the actual insertion time, and the cue command may also include descriptive parameters pertaining to the program attributes that the commercial must match (e.g., rate, stream construct such as number of audio streams, etc.). In any case, once the cue command has been processed, the inserter deletes it to prevent commercial killers from detecting the commercial.

The ad server 230 is analogous to the ad server 150 of FIG. 1. An encrypted post-insertion MPTS is output from the transcoder 210 and provided to a population of conventional set-top terminals via, e.g., a cable/fiber network using conventional techniques. If no insertion equipment is present, and thus the transcoder 210 does not forward its decrypted output to an inserter, the transcoder 210 should delete the cue_command to prevent downstream commercial killers from detecting commercials that have been inserted beforehand (i.e., a local commercial did not replace the national commercial).

For the case where the programming is originated locally from a server, the output of the server may be forwarded to the inserter. In this case the inserter is instructed by the controllers when to insert a commercial. In some case the server and the inserter functions may be integrated as one physical product. However the physical partitioning has no bearing on the functional steps that are required.

Scheduler/controller(s) 260, analogous to the scheduler/controller(s) 180 of FIG. 1, communicates with the ad server 230, and with the transcoder 210 and inserter(s) 220 via a headend network 250.

The MPTS provided by the headend 200 to the set-top terminals contains commercial content provided by any combination of: the original analog programming input, the uplink site ad server, and the headend ad server. Moreover, insertion of commercial content at either the uplink site or the headend is initiated by a cue command signal that is provided according to cue tones that may be present in the original analog programming input, and/or according to a control signal from the scheduler/controller at the uplink site 100 or the headend 200.

Figure 3:
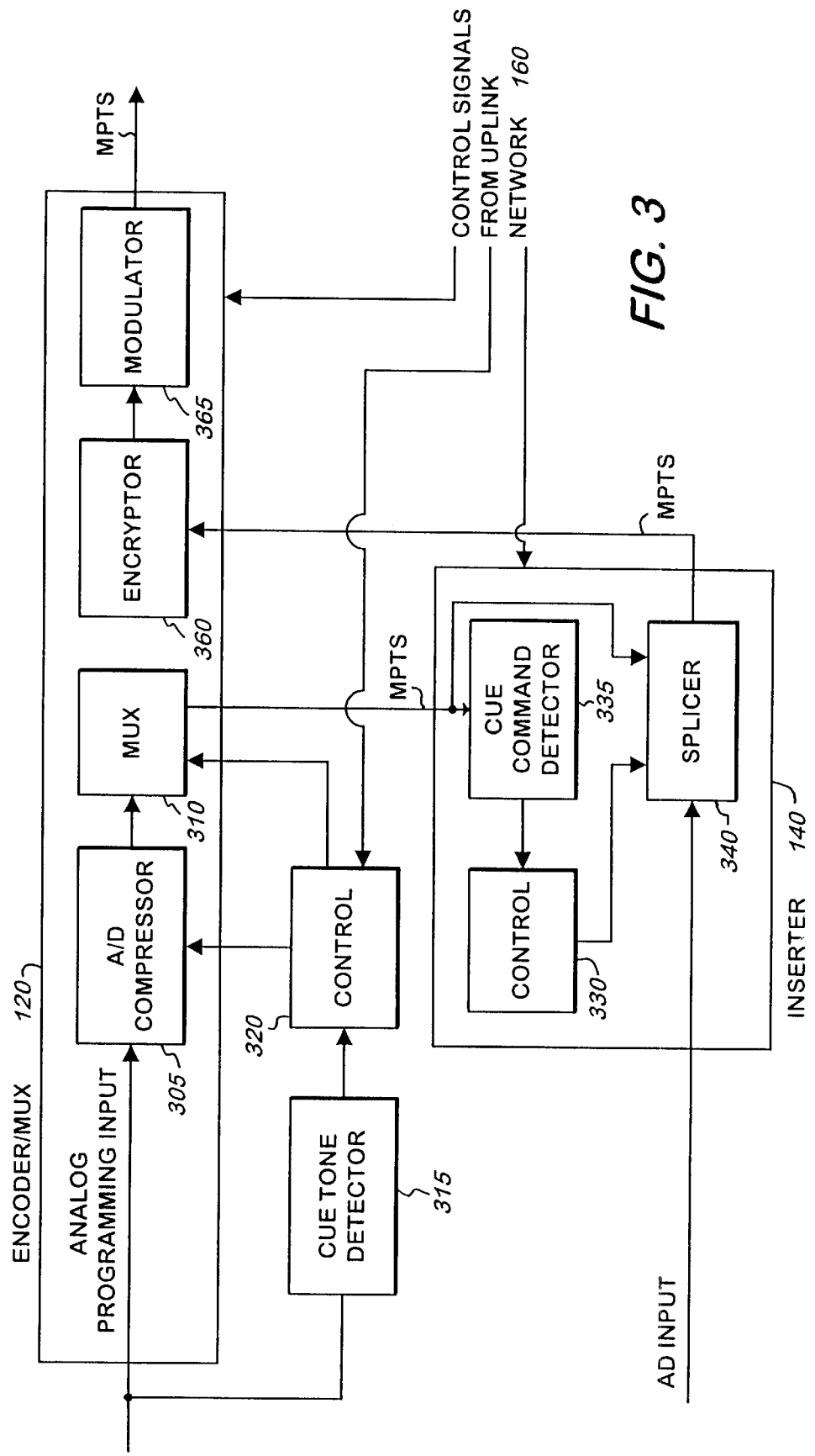
FIG. 3 illustrates details of the uplink site of FIG. 1 in accordance with the present invention.

At the headend 200, a method of applying the invention includes the following steps:
1. The multi-program transport stream (MPTS) is first received by the transcoder 210.
2. The transcoder 210 decrypts the appropriate programs within the multiplex and forwards them to the inserter 220.
3. The inserter 220 processes the cue commands and detects the splice point. It may forward the cue command to the ad server 230 for commercial processing in advance of the insertion time.
4. Once the inserter 220 has detected the splice point, it deletes the cue command from the stream and inserts the commercial(s)
5. The inserter monitors the stream for the second cue command (or until it times out) to splice back to the original multiplex.
6. The output of the inserter is fed back to the encryptor/modulation 130 for encryption and modulation FIG. 3 illustrates details of the uplink site of FIG. 1 in accordance with the present invention. Like-numbered elements correspond to one another. In the encoder/mux 120, the analog programming input is provided to an analog-to-digital (A/D) converter and compressor 305, and to a cue tone detector 315. The compressor performs conventional audio and video encoding and compression, including motion estimation and compensation, a spatial transform such as the DCT, quantization, variable length coding, and so forth. The cue tone detector uses known technology to detect the presence of cue tones. In response to such detection, a signal is provided to a control 320, which in turn generates a cue command message (e.g., a protocol message, that may span one or more MPEG-2 sections) and/or mux 310 for insertion into the digitized bit stream.

However, even if no cue tone is detected, the control 320 may provide the cue command message to the compressor 305 or the mux 310, depending on the desired splicing technique, in response to a control signal received from the uplink network 160 (e.g., from the real-time trigger 170, or the scheduler/controller(s) 180). Moreover, a digital programming input can also be accommodated with the present invention by bypassing the compressor and analog-to-digital (A/D) converter 305. No cue tone will be present in such a digital input, so the cue tone detector 315 can also be bypassed. The control 320 can still cause a cue command to be inserted into the digital input at the mux 310, e.g., in response to a control signal received from the uplink network 160 or a local scheduler/controller or real-time trigger.

The cue command signal is inserted in the transport layer of the bit stream so that it can be immediately detected without having to decode and/or decompress several layers of the bit stream. Additionally the encoder creates and adjusts the splice point parameters for subsequent splicing by the inserter.

Essentially, the digital cue command replaces the analog cue tone to signal the start and end of a commercial insertion period.

Encoded bit streams (from an analog input or an uncompressed digital input) are provided from the compressor 305 to a mux 310 to obtain an MPTS, which is then provided to the inserter 140. A cue command detector 335 detects the presence of the cue command the transport layer of the MPTS and processes the content of the cue command to prepare for insertion. Depending on the content of the cue command, the inserter 140 may forward it to the ad server for further processing A control 330 associated with the cue command detector 335 causes a splicer 340 to insert the commercial content (ad input) into the MPTS according to the detection of the cue command and splice point detection in the stream. An MPTS with the inserted commercial content is then provided to the encoder/mux 120 for processing by the (optional) encryptor 360 and the modulator 365 for transmission to a headend. When no cue commands are detected at the cue command detector 335, the MPTS passes through the splicer 340 unchanged. The output of the modulator 365 is an encrypted or an unencrypted MPTS.

Note that the encryptor 360 and modulator 365 are shown here as being physically part of the encoder/mux 120. However, this arrangement is optional. Moreover, the cue tone detector 315 and control 320 are also shown as being physically separate from the encoder/mux 120. However, again this is optional depending on the configuration and capabilities of the original equipment.

The inserter 140 is responsive to control signals from the uplink network 160 (e.g., from the real-time trigger 170, or the scheduler/controller(s) 180).

Note that the mux 310 may alternatively be used after the inserter 140 so that commercial and cue command insertion occurs for the individual single program transport streams (SPTSs). This may or may not be readily supportable depending on the encoder implementation.

Figure 4:
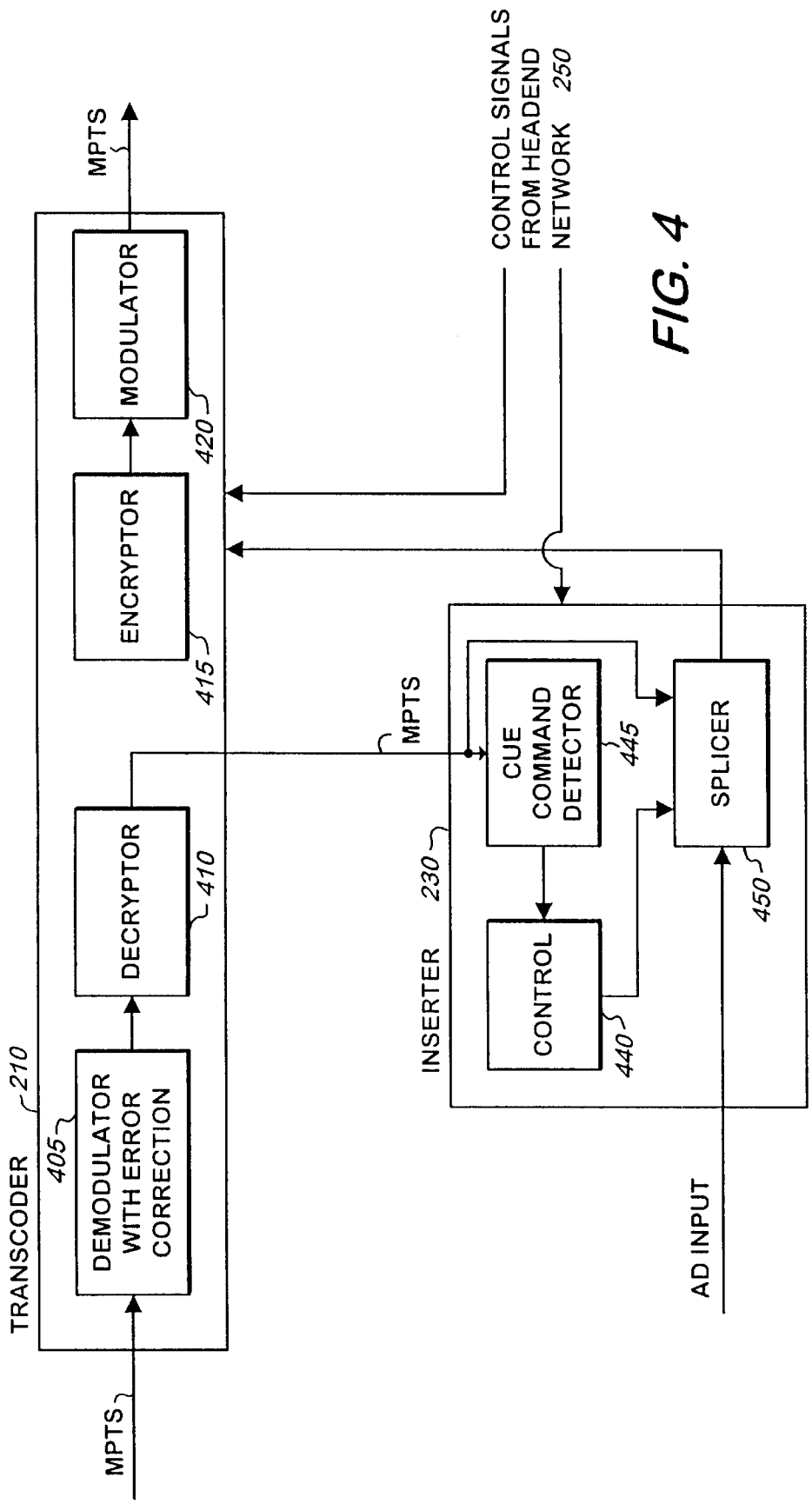
FIG. 4 illustrates details of the headend of FIG. 2 in accordance with the present invention.

FIG. 4 illustrates details of the headend of FIG. 2 in accordance with the present invention. Like-numbered elements correspond to one another.

The transcoder 210 receives the MPTS from the uplink site and provides it to a demodulator applying error correction 405 and a decryptor 410, if necessary. The demodulated and decrypted MPTS is forwarded to the inserter 230.

At the inserter 230, cue commands in the MPTS are detected at a cue command detector 445. In response to the presence of the cue commands, a control 440 commands a splicer 450 to insert commercial content from the local ad server into the MPTS. When no cue commands are detected at the cue command detector 445, or from an external source, the MPTS passes through the splicer 450 unchanged. The inserter may forward the detected cue_command to the ad server 155 for any required processing, as previously mentioned. However, even when no cue commands are detected at the cue command detector 445, a control signal from the headend network (e.g., from scheduler/controller 260 in FIG. 2) may command the splicer 450 to insert commercial content from the local ad server into the MPTS.

The headend may further employ a real-time trigger such as the trigger 170 used at the uplink site, e.g., for inserting emergency messages, or other special messages of local interest.

Note that the inserted commercial content may or may not overwrite existing commercial content or programming. For example, if the inserted information is complementary data such as HTML pages, the audiovisual content of the original stream may be left intact.

The unencrypted MPTS from the inserter 230 is provided to the transcoder 210 for processing by the (optional) encryptor 415 and a modulator 420. The encrypted or unencrypted MPTS that is provided to the set-top terminals conforms to the digital television standard used, such as MPEG-2, and can therefore be recovered, decoded and displayed in a conventional manner by the set-top terminals.

Accordingly, it can be seen that the present invention provides a system for inserting commercials into a digital television bit stream by providing cue commands in response to cue tones in a pre-existing analog signal, and/or in response to control signals from an uplink site or headend. Moreover, the cue commands are preferably carried in the transport layer of the bit stream so there is no need to decode, process, and re-encode several layers of the bit stream.

Accordingly, a new commercial insertion capability can be added to existing uplink and headend equipment without requiring expensive upgrades.

In particular, appropriate firmware upgrades are provided to the encoder to partition the splicing/insertion function between the encoder and the inserter. This enables commercial insertion at the uplink as well as the headend. If the input to the encoder is an analog signal, the encoder (or an external device) detects the cue commands and insert them in the multiplex for local insertion.

Other variations of the method are also possible. For example, the inserter 230 itself may consist of multiple cascaded inserters or splicers. The number of inserters may depend on the number of ad-supported programs (services) within a given multiplex.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with a cable or satellite television broadband communication networks, it will be appreciated that other networks such as wide area networks (WANs), and virtual private networks over the Internet may be used to transport the content to be inserted (presently, in non-real time fashion). As the multicast real-time delivery of the audio-visual content over packet-based networks (e.g., using the Internet Protocol) matures, both programming as well as the commercial content may traverse these networks. However such embodiments provide additional insertion opportunities, some of which are synergistic to what's been described, and others provide alternate paradigms.

Additionally, the invention is compatible with digital video standards other than MPEG-2.

What is claimed is:

1. A method for inserting digital commercials into a digital audiovisual bitstream, comprising the steps of:

processing a first analog audiovisual signal to determine whether analog cue tones are present therein;

encoding said first analog audiovisual signal as a digital spliceable data stream;

providing digital cue commands corresponding to said analog cue tones, if present, in said digital spliceable data stream;

said digital cue commands being provided in the form of a digital message in said digital spliceable data stream and indicating splicing points for splicing a digital commercial into the digital spliceable data stream; and forwarding the digital spliceable data stream to a commercial inserter; wherein:

said commercial inserter detects said digital cue commands and inserts a commercial into said digital spliceable data stream in response thereto at a splice point designated by a first detected digital cue command; and said commercial inserter monitors said digital spliceable data stream for a subsequent digital cue command to splice back from the inserted commercial to the digital spliceable data stream.

2. The method of claim 1, comprising the further steps of:

multiplexing a plurality of single video program transport streams including said digital spliceable data stream into a multi-program transport stream; and forwarding the multi-program transport stream to the commercial inserter.

3. The method of claim 2, wherein:

said digital cue commands are provided in said digital spliceable data stream at an uplink site;

said plurality of single video program transport streams including said digital spliceable data stream are multiplexed into the multi-program transport stream at said uplink site; and multi-program transport stream is forwarded from said uplink site to said commercial inserter at a headend.

4. The method of claim 2, wherein:

said digital cue commands are provided in said digital spliceable data stream at an uplink site;

said plurality of single video program transport streams including said digital spliceable data stream are multiplexed into the multi-program transport stream at said uplink site; and the multi-program transport stream is forwarded to said commercial inserter at said uplink site.

5. The method of claim 1, wherein:

said digital cue commands are provided in a transport layer of said digital spliceable data stream.

6. The method of claim 1, wherein:

digital cue commands are provided in said digital spliceable data stream regardless of a presence of said analog cue tones according to a real-time trigger or a scheduler/controller.

7. The method of claim 1, wherein:

said digital cue commands designate at least one desired program attribute of the inserted commercial.

8. A method in accordance with claim 7, wherein:

said at least one desired program attribute comprises at least one of bit rate and stream construct.

9. The method of claim 1, wherein:

the digital spliceable data stream is a constant bit rate or a variable bit rate stream.

10. An apparatus for inserting digital commercials into a digital audiovisual bitstream, comprising:

a cue tone detector for processing a first analog audiovisual signal to determine whether analog cue tones are present therein;

an encoder for encoding said first analog audiovisual signal as a digital spliceable data stream;

control responsive to said cue tone detector for providing digital cue commands corresponding to said analog cue tones, if present, in said digital spliceable data stream;

said digital cue commands being provided in the form of a digital message in said digital spliceable data stream and indicating splicing points for splicing a digital commercial into the digital spliceable data stream;

a commercial inserter; and means for forwarding the digital spliceable data stream to said commercial inserter; wherein:

said commercial inserter detects said digital cue commands and inserts a commercial into said digital spliceable data stream in response thereto at a splice point designated by a first detected digital cue command; and said commercial inserter monitors said digital spliceable data stream for a subsequent digital cue command to splice back from the inserted commercial to the digital spliceable data stream.

11. The apparatus of claim 10, further comprising:

a multiplexer for multiplexing a plurality of single video program transport streams including said digital spliceable data stream into a multi-program transport stream; and means for forwarding the multi-program transport stream to the commercial inserter.

12. The apparatus of claim 11, wherein:

said control and said multiplexer are provided at an uplink site; and said commercial inserter is provided at a headend.

13. The apparatus of claim 11, wherein:

said control, said multiplexer, and said commercial inserter are provided at an uplink site.

14. The apparatus of claim 10, wherein:

said digital cue commands are provided in a transport layer of said digital spliceable data stream thereof.

15. The apparatus of claim 10, wherein:

digital cue commands are provided in said digital spliceable data stream regardless of a presence of said analog cue tones according to a real-time trigger or a scheduler/controller.

16. The apparatus of claim 10, wherein:

said digital cue commands designate at least one desired program attribute of the inserted commercial.

17. The apparatus of claim 16, wherein;

said at least one desired program attribute comprises at least one of bit rate and stream construct.

18. The apparatus of claim 10, wherein:

the digital spliceable data stream is a constant bit rate or a variable bit rate stream.

* * * * *